(12) United States Patent
McKee

(10) Patent No.: US 9,161,547 B2
(45) Date of Patent: Oct. 20, 2015

(54) CONVEYOR OVEN

(75) Inventor: Philip R. McKee, Frisco, TX (US)

(73) Assignee: OVENTION, INC., Milwaukee, WI (US)

( * ) Notice: Subject to any disclaimer, the term of this patent is extended or adjusted under 35 U.S.C. 154(b) by 0 days.

(21) Appl. No.: 13/399,840

(22) Filed: Feb. 17, 2012

(65) Prior Publication Data
US 2013/0213380 A1 Aug. 22, 2013

(51) Int. Cl.
- *A21B 1/00* (2006.01)
- *A21B 1/22* (2006.01)
- *A21B 1/24* (2006.01)
- *A21B 1/48* (2006.01)
- *A21B 3/02* (2006.01)

(52) U.S. Cl.
CPC . *A21B 1/245* (2013.01); *A21B 1/48* (2013.01); *A21B 3/02* (2013.01)

(58) Field of Classification Search
USPC ........... 99/443, 386, 446–450, 473–476, 483, 99/387, 443 C, 443 R, 427; 126/21; 219/388–400
See application file for complete search history.

(56) References Cited

U.S. PATENT DOCUMENTS

| | | | |
|---|---|---|---|
| 3,910,175 A | 10/1975 | Smith | |
| 4,244,284 A | 1/1981 | Flavan et al. | |
| 4,252,055 A | 2/1981 | Johansson et al. | |
| 4,745,249 A * | 5/1988 | Daniels | 219/730 |
| 4,834,247 A * | 5/1989 | Oshima et al. | 426/107 |
| 4,980,529 A * | 12/1990 | Bolton | 219/752 |
| 5,231,920 A * | 8/1993 | Alden et al. | 99/443 C |
| 5,253,564 A * | 10/1993 | Rosenbrock et al. | 99/328 |
| 5,826,496 A | 10/1998 | Jara | |
| 5,934,178 A | 8/1999 | Caridis et al. | |
| 6,098,529 A * | 8/2000 | Brummett et al. | 99/467 |
| 6,140,626 A | 10/2000 | McKee et al. | |
| 6,369,360 B1 | 4/2002 | Cook | |
| RE37,706 E | 5/2002 | Chung | |
| 6,488,973 B1 * | 12/2002 | Wright | 426/114 |
| 6,896,919 B2 * | 5/2005 | Wright | 426/92 |
| 2005/0132899 A1 * | 6/2005 | Huang et al. | 99/386 |
| 2005/0173425 A1 * | 8/2005 | Wnek et al. | 219/730 |
| 2005/0184065 A1 * | 8/2005 | Tucker et al. | 219/730 |
| 2005/0205547 A1 * | 9/2005 | Wenzel | 219/388 |
| 2005/0230384 A1 * | 10/2005 | Robison et al. | 219/730 |
| 2006/0191918 A1 * | 8/2006 | Ashford et al. | 219/728 |

(Continued)

OTHER PUBLICATIONS

International Search Report of PCT/US2013/025726 dated Apr. 19, 2013.

*Primary Examiner* — Dana Ross
*Assistant Examiner* — Michael Laflame, Jr.
(74) *Attorney, Agent, or Firm* — Amster, Rothstein & Ebenstein LLP

(57) ABSTRACT

A conveyor oven is disclosed. The conveyor oven includes a housing, a conveyor belt, a first and second doors, and a heat source. The housing includes a cavity and a first and second openings. The conveyor belt is configured to receive and transport food items in and out of the cavity through the first and second openings. The conveyor belt includes a loading section and an unloading section for food. The first and second doors cover first and second openings, respectively, in order to prevent heat within the cavity from escaping through the first and second openings during operation. Configured to provide different cooking times and thermal profiles to various types of food items, the heat source provides heat to the cavity for heating up any food item placed on a portion of the conveyor belt located within the cavity.

6 Claims, 4 Drawing Sheets

(56) References Cited

U.S. PATENT DOCUMENTS

| | | |
|---|---|---|
| 2007/0131215 A1 | 6/2007 | McVeagh et al. |
| 2007/0137633 A1 | 6/2007 | McFadden |
| 2008/0067166 A1 | 3/2008 | Yoder et al. |
| 2008/0156201 A1 | 7/2008 | Cook |
| 2009/0075224 A1* | 3/2009 | Wiker et al. .................. 432/8 |
| 2009/0090252 A1 | 4/2009 | Ewald et al. |
| 2009/0223503 A1 | 9/2009 | Wiker et al. |
| 2011/0283894 A1 | 11/2011 | Schjerven, Sr. et al. |

* cited by examiner

CONVEYOR OVEN

BACKGROUND OF THE INVENTION

1. Technical Field

The present invention relates to conveyor ovens in general, and in particular to a conveyor oven capable of providing continuous, precise cooking of a variety of foods that require different cook times and thermal profiles, while preventing heat loss.

2. Description of Related Art

A conveyor oven typically has a first opening through which uncooked food enters and a second opening at the opposite end of the oven through which cooked food exits. A stainless steel conveyor belt is commonly used to carry food items through a heated cavity between the first and second openings. The conveyor belt extends past both openings sufficiently to allow safe insertion and retrieval of food items. This arrangement allows food items to be placed on the conveyor belt on a continuous basis to achieve sequential steady-state cooking.

When food items offered by a commercial food service operation, such as a restaurant, are to be cooked at the same thermal profile for the same amount of time, a conveyor oven is particularly advantageous. The operators need only set the temperature, the blower speeds and conveyor belt speed as necessary to cook the selected foods. Once the above-mentioned three parameters are set, the oven may be operated continuously without any further adjustments. With a conveyor oven, even a person unskilled in the art of cooking is able to prepare high-quality cooked food products simply by placing them on a conveyor belt of the conveyor oven. The ease of operation and high throughput make conveyor ovens highly desirable in restaurants and other commercial food service settings.

However, conveyor ovens also have many disadvantages. For example, most commercial food service operations offer a variety of different food items, such as pizza, chicken, vegetables and pie, which require a wide range of cooking times and thermal profiles. Even a single food order at a restaurant may include a variety of food items, and different food items require different cooking times. Conveyor ovens are very efficient when cooking similar food items, but not for cooking a variety of food items that require vastly different cooking times and thermal profiles.

Consequently, it would be desirable to provide an improved conveyor oven.

SUMMARY OF THE INVENTION

In accordance with a preferred embodiment of the present invention, a conveyor oven includes a housing, a conveyor belt, a first and second doors, and a heat source. The housing includes a cavity and a first and second openings. The conveyor belt is configured to receive and transport food items in and out of the cavity through the first and second openings. The conveyor belt includes a loading section and an unloading section for food. The first and second doors cover first and second openings, respectively, in order to prevent heat within the cavity from escaping through the first and second openings during operation. Configured to provide different cooking times and thermal profiles to various types of food items, the heat source provides heat to the cavity for heating up any food item placed on a portion of the conveyor belt located within the cavity.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
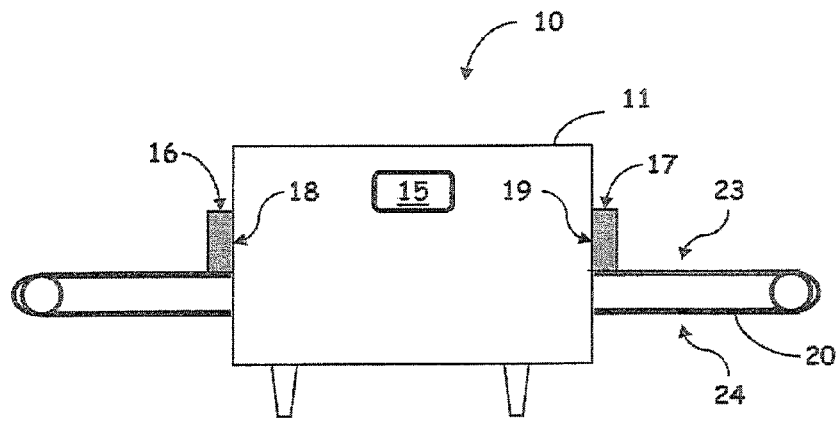
FIG. 1 is a front view of a conveyor oven, in accordance with a preferred embodiment of the present invention.
Figure 2:
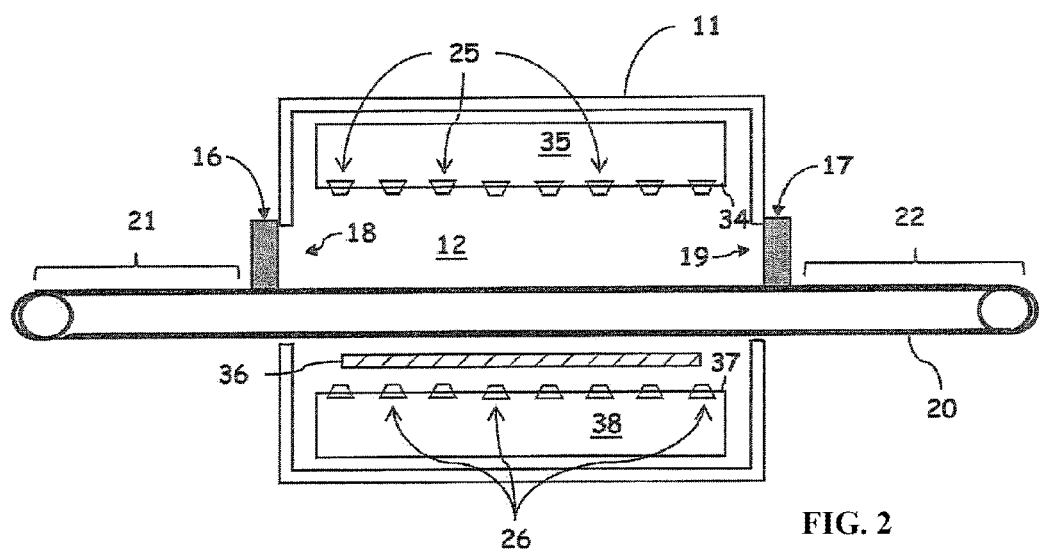
FIG. 2 is a cross-sectional view of the conveyor oven from FIG. 1, in accordance with a preferred embodiment of the present invention.

Referring now to the drawings and in particular to FIGS. 1 and 2, there are depicted a front and cross-sectional view of a conveyor oven, in accordance with a preferred embodiment of the present invention. As shown, a conveyor oven 10 is defined by a housing 11 having a cavity 12. Housing 11, as well as cavity 12, has a first opening 18 and a second opening 19. Conveyor oven 10 includes a heating and airflow system (not shown) to supply heat to cavity 12 for heating up any food items that have been carried into cavity 12 from first opening 18 via a metal conveyor belt 20. Conveyor belt 20 has an upper surface 23 and a lower surface 24. Since upper surface 23 and lower surface 24 are part of conveyor belt 20, upper surface 23 and lower surface 24 are substantially identical at any given time. Conveyor oven 10 also includes a first door 16 for covering first opening 18, and a second door 17 for covering second opening 19, when appropriate.

Conveyor oven 10 also includes a control panel 15. Control panel 15 is preferably implemented with a touchscreen but it can also be implemented with a keypad and liquid crystal display (LCD). An operator can enter commands, such as mode of operations, cooking temperatures within cavity 12, cooking time, blower speed, etc., via control panel 15 to effectuate cooking controls on any food items placed within cavity 12. Control panel 15 is preferably associated with a non-volatile memory for storing various cooking instructions, such as cook times, cook temperatures and blower speeds, for different food items under the names or graphical representations of corresponding food items.

Housing 11 accommodates conveyor belt 20 having a food loading section 21 for receiving various uncooked food items and a food unloading section 22 for gathering various cooked food items once they have traveled through cavity 12. Any food item intended to be cooked can be initially placed on food loading section 21. Conveyor belt 20 is connected to a stepper motor (not shown) that controls the linear movement of conveyor belt 20 in and out of cavity 12. Since food loading section 21 and food unloading section 22 are part of conveyor belt 20, the surfaces of food loading section 21 and food unloading section 22 are substantially identical at any given time.

First and second openings 18 and 19 can be covered by first and second doors 16 and 17, respectively, during cooking and also when conveyor oven 10 is being idle (i.e., when there is no food located within cavity 12 and conveyor belt 20 is not moving). The purpose of first and second doors 16, 17 is to prevent heat loss from cavity 12 via first and second openings 18, 19, respectively, at all times other than when food is being transported in or out of cavity 12 on conveyor belt 20.

In addition, housing 11 also contains a top plenum 35 and a bottom plenum 38. Top plenum 35 is connected to a top nozzle plate 34. Bottom plenum 38 is connected to a bottom nozzle plate 37. Top nozzle plate 34, top plenum 35, bottom nozzle plate 37 and bottom plenum 38 are part of the heating and airflow system for conveyor oven 10 such that heated air in top plenum 35 and bottom plenum 38 are in gaseous communication with cavity 12 through top nozzle plate 34 and bottom nozzle plate 37, respectively. Top nozzle plate 34 includes multiple conical shaped top nozzles 25, and bottom nozzle plate 37 includes multiple conical shaped bottom nozzles 26. Nozzles 25, 26 are configured to direct pressurized hot airstreams towards any food items placed on the portion of conveyor belt 20 located within cavity 12. Although air passes through top nozzle plate 34 and bottom nozzle plate 37 into cavity 12, it is understood by those skilled in the art that top plenum 35 or bottom plenum 38 could be in gaseous communication with cavity 12 via a variety of air opening configurations such as tubes, rectangular openings and the like. Moreover, air can enter cavity 12 through one or both of top plenum 35 or bottom plenum 38.

For additional heating, an optional infrared radiation heating element 36 can be placed within cavity 12 somewhere between conveyor belt 20 and bottom nozzle plate 38 or between conveyor belt 20 and top nozzle plate 34 for supplying heat towards any food items located within cavity 12. It is understood by those skilled in the art that other heating means, such as microwave, steam or a combination thereof, can be used instead of infrared radiation heating element 36.

Figure 3:
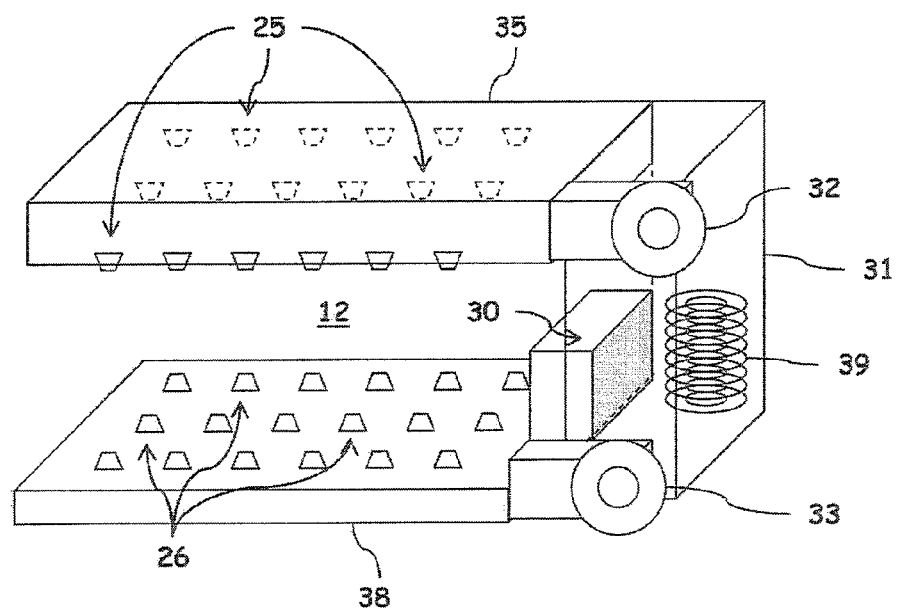
FIG. 3 is a diagram of a heating and airflow system within the conveyor oven from FIG. 1, in accordance with a preferred embodiment of the present invention.

Referring now to FIG. 3, there is depicted a diagram of the heating and airflow system within conveyor oven 10, in accordance with a preferred embodiment of the present invention. Air within cavity 12 is initially pumped into a heater plenum 31 via an intake opening 30. Heater plenum 31 includes a heater 39. After it has been sufficiently heated by heater 39, the hot air is then directed to top plenum 35 via a top blower 32 and to bottom plenum 38 via a bottom blower 33. The pressurized hot air formed within top plenum 35 is subsequently directed to cavity 12 via multiple nozzles 25 located on top nozzle plate 34 (from FIG. 2). Similarly, pressurized hot air formed within bottom plenum 38 is subsequently directed to cavity 12 via multiple nozzles 26 located on bottom nozzle plate 37 (from FIG. 2). Although heated air is shown to be sent to top air plenum 35 and bottom plenum 38 via separate blowers, it is understood by those skilled in the art that heated air can be sent to both top plenum 35 and bottom plenum 38 via a single blower.

Preferably, the diameter of the openings of nozzles 25, 26 may range from ¼" to ½". Each of nozzles 25, 26 can provide a pressurized hot airstream of 1" diameter coverage directed towards any food items placed on the portion of conveyor belt 20 located approximately 4" from top nozzle plate 34 or bottom nozzle plate 37. After a food item has been placed in the center of cavity 12 by conveyor belt 20, conveyor belt 20 can stop moving, and pressurized hot airstreams can be directed towards the food item placed on conveyor belt 20 to begin the cooking process. At this point, conveyor belt 20 may move in a slight to-and-fro fashion (i.e., from left to right and from right to left). For example, conveyor belt 20 may vacillate between ½" left of the stopping point and ½" right of the stopping point in order to increase the hot airstream coverage on the food item on conveyor belt 20, and to avoid overheating of a food item at any spot located directly underneath one of nozzles 25 or directly above one of nozzles 26. It will be appreciated by those skilled in the art that the placement of nozzles 25 in top nozzle plate 34 and also the placement of nozzles 26 in bottom nozzle plate 37 will be selected such that the slight to-and-fro movement in conveyor belt 20 will be sufficient to travel the left-to-right distance between individual nozzles in top nozzle plate 34 and bottom nozzle plate 37.

In a preferred embodiment of the present invention, conveyor oven 10 has at least two modes of operation, namely, a burst mode and a continuous mode. FIGS. 4a-4e show the burst mode of operation, and FIGS. 5a-5d show the continuous mode of operation.

Figure 4A:
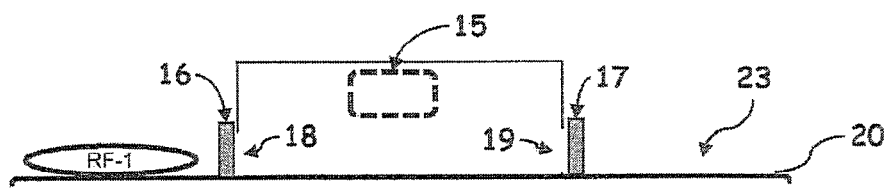
FIGS. 4a-4e illustrate a method of cooking food items separately in the conveyor oven from FIG. 1, in accordance with a preferred embodiment of the present invention.
Figure 4B:
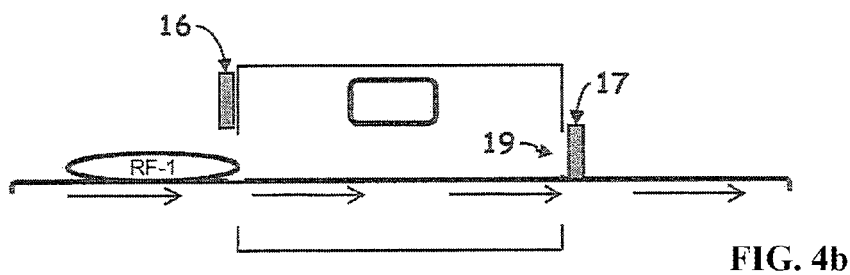

For the burst mode of operation, a first raw food item RF-1 is initially placed on food loading section 21 (from FIG. 2), as shown in FIG. 4a. Various types of food items, such as "16-inch pepperoni pizza," "12 chicken breasts," etc., are displayed on control panel 15. A selection of a food item displayed on control panel 15 by a user initiates the burst mode operation. Suffice to say, the food item selection from control panel 15 should correspond with first raw food item RF-1. At this point, first oven door 16 opens and first raw food item RF-1 is then transported to cavity 12 via conveyor belt 20 (i.e., with conveyor belt upper surface 23 moving from left to right, as depicted in FIG. 4b). Once first raw food item RF-1 has been situated within cavity 12, first oven door 16 will be automatically lowered to cover first opening 18, as shown in FIG. 4c, to prevent heat loss from cavity 12 during the cooking of first raw food item RF-1.

During the cooking process, pressurized hot air is directed through top and bottom nozzle plates 34, 37, through nozzles 25, 26, into cavity 12 for a period of time and at blower speeds and cook temperatures that have been previously stored in control panel 15 to effectuate cooking of food items substantially similar to the item represented by the food item selected. In FIG. 4c, first raw food item RF-1 is shown to be positioned centrally within openings 18 and 19. Once first raw food item RF-1 has been situated within cavity 12, first raw food item RF-1 will remain in that general location for the duration of the cook cycle so that the portion of first raw food item RF-1 that is beneath one of nozzles 25 or above one of nozzles 26 will remain generally in that location for the duration of the cook cycle.

Figure 4C:
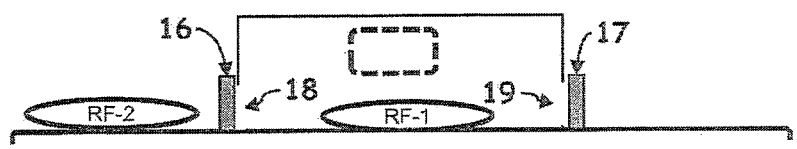
Figure 4D:
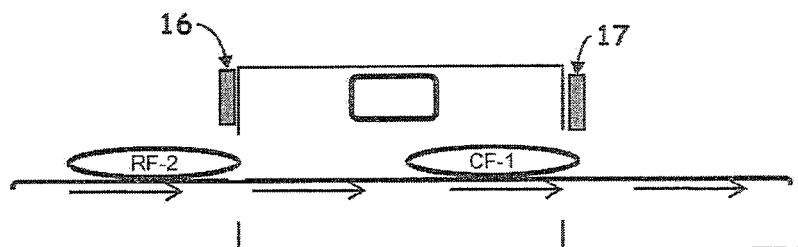

In the meantime, a second raw food item RF-2 can be placed on food loading section 21 (from FIG. 2) as shown in FIG. 4c and the corresponding food item displayed on control panel 15 can be selected. Second raw food item RF-2 can be substantially the same as first raw food item RF-1, which requires the same cook time and blower speeds to be properly cooked, or second raw food item RF-2 can be completely different from first raw food item RF-1, which requires completely different cook time and blower speeds to be properly cooked. After first raw food item RF-1 has been fully cooked, both first door 16 and second door 17 open, and the fully cooked food item (now CF-1) is sent to food unloading section 22 (from FIG. 2) via conveyor belt 20 (i.e., with conveyor belt upper surface 23 moving from left to right) and second raw food item RF-2 is transported from food loading section 21 to cavity 12, as depicted in FIG. 4d.

Figure 4E:
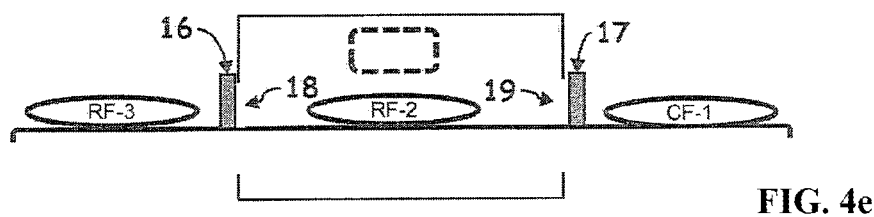

Once second raw food item RF-2 has been situated within cavity 12, both first and second doors 16, 17 will be automatically lowered to cover first and second openings 18, 19, respectively, to prevent heat loss from cavity 12 during the cooking of second raw food item RF-2, as shown in FIG. 4e. At this point, first cooked food item CF-1 can be removed from food unloading section 22, and food loading section 21 is ready to receive a third raw food item RF-3.

The above-mentioned sequence can be performed repeatedly for different types of food items. Since different cooking times can be entered by an operator, any of the above-mentioned food items can be completely different from each other.

It will be readily apparent to those skilled in the art that when only one food item needs to be cooked, only one of first and second doors 16, 17 will be raised or lowered corresponding with the movement of the food item into or out of cavity 12.

Figure 5A:
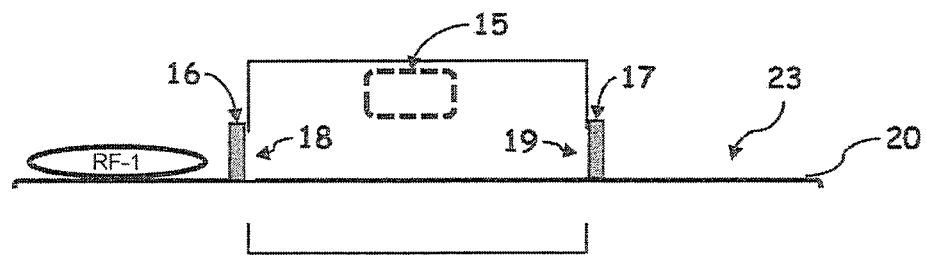
FIGS. 5a-5d illustrate a method of cooking food continuously in the conveyor oven from FIG. 1, in accordance with a preferred embodiment of the present invention.
Figure 5B:
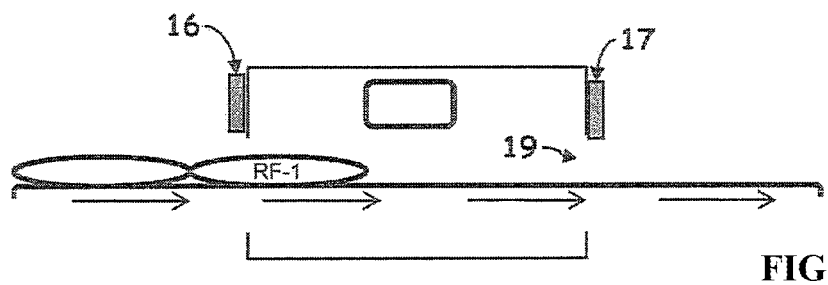
Figure 5C:
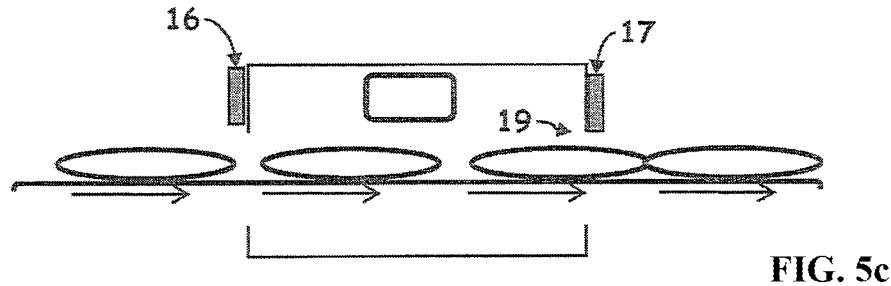
Figure 5D:
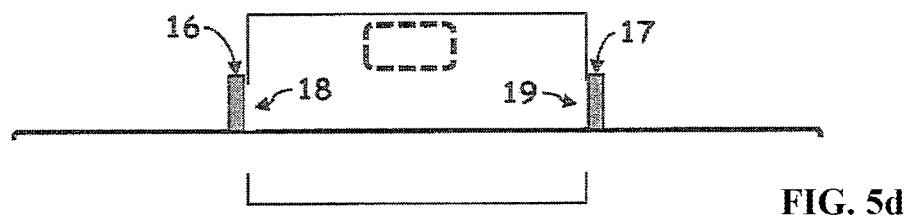

If a user desires to cook multiple substantially similar cook items as quickly as possible, the user may select the continuous mode of operation from control panel 15. During the continuous mode of operation, conveyor belt 20 is running continuously in one direction according to the preference of the operator. Initially, a first raw food item RF-1 is placed on food loading section 21 (from FIG. 2), as shown in FIG. 5a. During the continuous mode of operation, first and second doors 16, 17 are lifted up completely the entire time. For example, raw food items can be placed on food loading section 21 (from FIG. 2) and the cooked food items can be retrieved from food unloading section 22 (from FIG. 2) after they have been thoroughly cooked within cavity 12. In essence, the continuous mode is similar to the standard operation method of conventional conveyor ovens, as depicted in FIGS. 5b and 5c. Once the multiple substantially similar food items have been cooked, the operator can make a selection from control panel 15 to place conveyor oven 10 in idle, with both first and second doors 16, 17 in closed position, as shown in FIG. 5d.

As has been described, the present invention provides an improved conveyor oven for continuously cooking a wide variety of food items while preventing heat loss in order to improve energy efficiency.

While the invention has been particularly shown and described with reference to a preferred embodiment, it will be understood by those skilled in the art that various changes in form and detail may be made therein without departing from the spirit and scope of the invention.

What is claimed is:

1. An oven comprising:
 a housing having a cavity, a first opening, and a second opening;
 a conveyor belt extending through the first opening, the cavity, and the second opening;
 a control panel displaying a plurality of cooking settings corresponding to different food items for selection by a user;
 a first oven door for covering the first opening to prevent heat within the cavity from escaping through the first opening;
 a second oven door for covering the second opening to prevent heat within the cavity from escaping through the second opening; and
 a heat source for providing heat to the cavity for heating up any food item placed on a portion of the conveyor belt located within the cavity,
 wherein the control panel is configured to (1) receive the user's selection of a first cooking setting corresponding to a first food item placed on the conveyor belt and initiate a first cooking operation based on the first cooking setting when the first food item is transported into the cavity for cooking; and (2) receive the user's selection of a second cooking setting corresponding to a second food item placed on the conveyor belt and initiate a second cooking operation based on the second cooking setting when the second food item is transported into the cavity for cooking, and
 wherein the conveyor belt is configured to (1) receive the first food item outside the cavity; (2) transport the first food item into the cavity through the first opening; (3) move the first food item within the cavity in a to-and-fro fashion during the first cooking operation; (4) receive the second food item while the first food item is within the cavity; and (5) transport the first food item out of the cavity through the second opening after the completion of the first cooking operation and transport the second food item into the cavity through the first opening.

2. The oven of claim 1, wherein the to-and-fro fashion includes the conveyor belt being vacillated between ½" left of a stopping point and ½" right of said stopping point.

3. The oven of claim 1, further comprising a stepper motor to drive the conveyor belt.

4. The oven of claim 1, wherein the cavity includes a plenum, a nozzle plate having multiple nozzles, and a blower for forcing air from the heat source through the plenum and the nozzle plate.

5. The oven of claim 1, wherein the control panel comprises a touch-screen, a key pad, or a liquid crystal display.

6. The oven of claim 1, further comprising a non-volatile memory for storing the plurality of cooking settings for different food items.

* * * * *